(12) United States Patent
Kim et al.

(10) Patent No.: US 8,089,909 B2
(45) Date of Patent: Jan. 3, 2012

(54) METHOD OF TRANSMITTING/RECEIVING DATA IN SENSOR NETWORK FOR REDUCING OVERHEARING OF SENSOR NODES

(75) Inventors: Se Han Kim, Daejeon (KR); Kyeseon Lee, Daejeon (KR); Chong-Ho Yoon, Seoul (KR); Gang-Ho Byun, Seoul (KR); Nae-Soo Kim, Daejeon (KR); Cheol Sig Pyo, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 408 days.

(21) Appl. No.: 12/149,255

(22) Filed: Apr. 29, 2008

(65) Prior Publication Data

US 2009/0103437 A1 Apr. 23, 2009

(30) Foreign Application Priority Data

Oct. 22, 2007 (KR) .................... 10-2007-0106213

(51) Int. Cl.
*G08C 17/00* (2006.01)
*H04J 3/16* (2006.01)
*H04J 3/22* (2006.01)

(52) U.S. Cl. ........................................ 370/311; 370/470
(58) Field of Classification Search ............ None
See application file for complete search history.

(56) References Cited

U.S. PATENT DOCUMENTS

| 7,103,511 | B2 | 9/2006 | Petite | |
| 2009/0103564 | A1* | 4/2009 | Lee et al. | 370/470 |
| 2011/0134818 | A1* | 6/2011 | Bae et al. | 370/311 |

FOREIGN PATENT DOCUMENTS

| KR | 10-0646824 | 11/2006 |
| KR | 10-0656385 | 12/2006 |
| KR | 10-2007-0007642 | 1/2007 |

(Continued)

OTHER PUBLICATIONS

"Energy-efficient reception of large preambles in MAC protocols for wireless sensor networks" Avvenuti, M.; Corsini, P.; Masci, P.; Vecchio, A.; Dipt. D Ingegneria dell'Informazione, Univ. di Pisa; Electronics Letters:: Issue Date: Mar. 1 2007, vol. 43 Issue:: 5 on pp. 59-60.*

(Continued)

*Primary Examiner* — Xavier Wong
(74) *Attorney, Agent, or Firm* — Staas & Halsey LLP

(57) ABSTRACT

Provided is a method of transmitting/receiving data in a sensor node for reducing overhearing of sensor nodes, and a sensor network which implements the method. A sender node having transmission data from among a plurality of nodes which perform a low power listening (LPL) operation in an asynchronous manner at predetermined time intervals, generates a long preamble including short preambles, each having information including a destination address of the transmission data, a remainder of the long preamble, and a length of the transmission data, and sequentially transmits the second preamble and the transmission data. A receiver node from among the plurality of nodes determines whether a valid signal is sensed during an active state in the LPL operation. If it is determined that the valid signal is sensed, the receiver node receives the short preamble transmitted from the sender node. The receiver node determines a duration time of a deactivated state of the receiver node based on the received first preamble, thereby reducing overhearing in the sensor network.

19 Claims, 7 Drawing Sheets

FOREIGN PATENT DOCUMENTS

| KR | 10-2007-0009102 | 1/2007 |
|----|-----------------|--------|
| KR | 10-2007-0057623 | 6/2007 |
| KR | 10-2007-0057629 | 6/2007 |

OTHER PUBLICATIONS

"X-MAC: A Short Preamble MAC Protocol for Duty-Cycled Wireless Sensor Networks" Michael Buettner, Gary Yee, Eric Anderson, Richard Han Department of Computer Science, University of Colorado at Boulder, Technical Report CU-CS-1008-06, May 2006 retrieved at http://citeseerx.ist.psu.edu/viewdoc/download?doi=10.1.1.90.1491.pdf.*

Korean Patent Office Patented English Translation of the same application.*

Joseph Polastre et al., "Versatile Low Power Media Access for Wireless Sensor Networks", Proceedings of the 2nd International Conference on Embedded Networked Sensor Systems, 13 pages.

Marco Avvenuti et al., "Increasing the efficiency of preamble sampling protocols for wireless sensor networks", Mobile Computing and Wireless Communications International Conference, Sep. 2006, pp. 1-6.

Korean Office Action issued on Apr. 23, 2009 in corresponding Korean Patent Application 10-2007-0106213.

Tijs van Dam et al., "An Adaptive Energy-Efficient MAC Protocol for Wireless Sensor Networks", Faculty of Information Technology and Systems Delft University of Technology, The Netherlands.

Korean Office Action issued Oct. 23, 2009 in corresponding Korean Patent Application 10-2007-0106213.

* cited by examiner

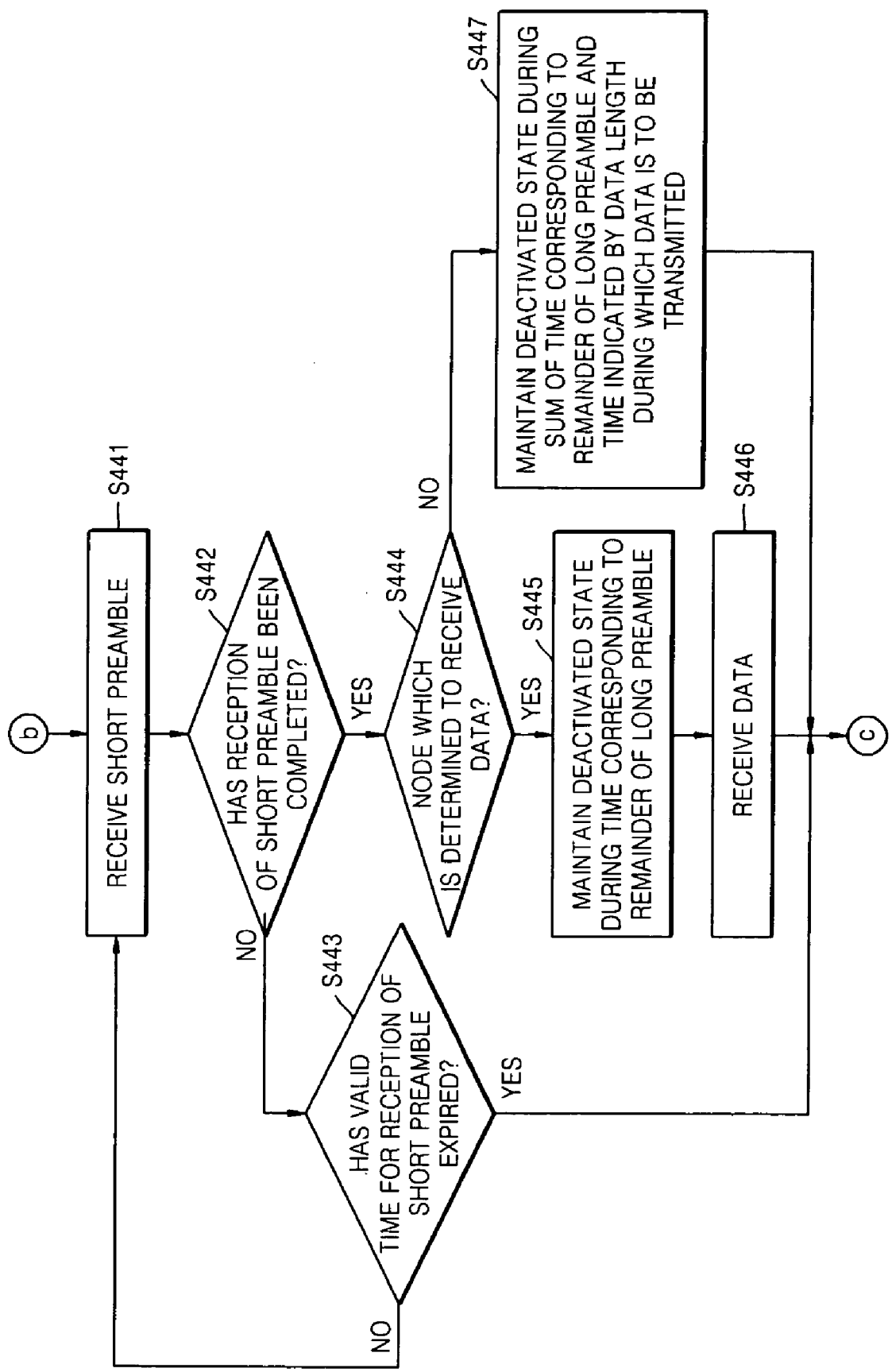

METHOD OF TRANSMITTING/RECEIVING DATA IN SENSOR NETWORK FOR REDUCING OVERHEARING OF SENSOR NODES

CROSS-REFERENCE TO RELATED PATENT APPLICATION

This application claims the benefit of Korean Patent Application No. 10-2007-0106213, filed on Oct. 22, 2007, in the Korean Intellectual Property Office, the disclosure of which is incorporated herein in its entirety by reference.

BACKGROUND OF THE INVENTION

1. Field of the Invention

The present invention relates to a method of transmitting/receiving data in a sensor node for reducing overhearing of sensor nodes, and a sensor network which implements the method.

The present invention is derived from a research project supported by the Information Technology (IT) Research & Development (R&D) program of the Korean Ministry of Information and Communication (MIC) and the Institute for Information Technology Advancement (IITA) [Subproject NO.: 2005-S-106-03, Subproject Name: Development of Sensor Tag and Sensor Node Technologies for RFID/USN].

2. Description of the Related Art

When a node which desires to transmit data in a sensor network that operates in an asynchronous manner, especially in a media access control (MAC) layer of the sensor network, notifies neighboring nodes that it has data to be transmitted (or transmission data), or transmits the data, the neighboring nodes may receive a signal generated from the notification or transmission even if the signal is not needed by the neighboring nodes. Such a phenomenon is referred to as overhearing. A sensor node that overhears an unwanted signal consumes power, i.e., energy due to the reception of the signal. There are several conventional techniques for reducing unnecessary energy consumptions.

First, the Berkeley MAC, also called the B-MAC (J. Polastre & J. Hill & D. Culler, 'Versatile Low Power Media Access for Wireless Sensor Networks', 'Proceedings of the 2nd International Conference on Embedded Networked Sensor Systems', pp. 95-107, November 2004) reduces the overhead of a protocol for synchronization by controlling a network to operate in an asynchronous manner by using preamble sampling, and reduces energy consumption by minimizing an awake operation in which each node checks whether its neighboring nodes have transmission data destined for itself in an environment where no data transmission is performed.

FIG. 1 is a diagram for explaining operations of sender node 101, receiver node 102, and other nodes 103, according to the B-MAC.

Referring to FIG. 1, the nodes 101, 102, and 103 perform a low power listening (LPL) operation in which they wake up at different times at predetermined intervals called check intervals and check whether a channel is being used. The sender node 101, which contains transmission data, confirms that the channel is in an idle mode by performing the LPL operation and transmits a preamble having a length that is longer than the check interval to notify the neighboring receiver node 102 and other nodes 103 that are capable of reception that the sender node 101 contains the transmission data. The sender node 101 then transmits a transmission frame, i.e., the transmission data, after the transmission of the preamble. The neighboring receiver node 102 and other nodes 103 wake up at check intervals to perform the LPL operation. Upon sensing the preamble transmitted by the sender node 101, the neighboring receiver node 102 and other nodes 103 overhear the preamble transmitted by the sender node 101 until they receive a destination address (DA) of the transmission data because the transmission data may be destined for the neighboring receiver node 102 and other nodes 103. If the neighboring receiver node 102 receives the DA of the transmission data and confirms that the neighboring receiver node 102 is a destination of the transmission data, it continues receiving the transmission data to the end of the transmission data. If the other nodes 103 are not the destined objects for the transmission data, they operate in a sleep state. However, according to this conventional technique, both the receiver node 102 and other nodes 103 neighboring the sender node 101 have to unnecessarily receive, i.e. overhear the preamble until they receive the DA of the transmission data. Moreover, a long preamble needs to be used during a transmission process and data has to be overheard (the overhearing is indicated by 104) during a reception process. In other words, the sender node 101, receiver node 102, and other nodes 103 need to consume a large amount of energy.

Second, the B-MAC+ (Marco Avvenuti & Paolo Corsini & Paolo Masci & Alessio Vecchio, 'Increasing the efficiency of preamble sampling protocols for wireless sensor networks', 'Mobile Computing and Wireless Communications International Conference', September 2006) solves the problems of the B-MAC to some extent.

FIG. 2 is a diagram illustrating operations of sensor nodes, according to the B-MAC+.

Referring to FIG. 2, like in the B-MAC, sender node 211, receiver node 212, and other nodes 213 repeat the LPL operation and a sleep operation.

However, the sender node 211 continuously transmits a short preamble called a wake-up preamble during a preamble interval in order to inform the neighboring receiver node 212 and other nodes 213 of a DA of transmission data and the number of remaining wake-up preambles. In other words, the sender node 211 containing the transmission data continuously transmits the wake-up preamble composed of a preamble-of-wake-up-preamble (PWP) field, a start frame delimiter (SFD) field, a DA field, and a countdown-information-of-wake-up-preamble field after the LPL operation.

The neighboring receiver node 212 and other nodes 213, which wake up from a sleep state at check intervals to perform the LPL operation, wake up upon sensing traffic and receive the wake-up preamble.

In this case, if the neighboring other nodes 213 are not destinations of the transmission data, they check the countdown-information-of-wake-up-preamble field of the received wake-up preamble and sleep until the end of a long preamble. If the neighboring receive node 212 is the destination of the transmission data, it checks the countdown-information-of-wake-up-preamble field of the received wake-up preamble, sleeps until the end of the long preamble, and then wakes up to receive the transmission data.

Therefore, by avoiding the reception of the entire long preamble during a long preamble interval of FIG. 4 corresponding to the preamble interval of FIG. 3, the B-MAC+ solves the overhearing problem of the B-MAC. However, if some of the neighboring other nodes 213 for which the transmission data of the sender node 211 is not destined sleep due to early reception of a wake-up preamble, they may wake up for a next LPL operation during the data transmission of the sender node 211 as indicated by 214. In this case, some of the neighboring other nodes 213 operating as illustrated on a time axis 213a may overhear the wake-up preamble after the LPL operation.

SUMMARY OF THE INVENTION

The present invention provides a method of transmitting data, a method of receiving data, and a method of transmitting/receiving data in a sensor network in order to reduce overhearing of sensor nodes, and a sensor network that implements the methods, thereby solving a problem of the B-MAC+ that neighboring nodes of a sender node wake up and overhear data during data transmission of the sender node.

According to an aspect of the present invention, there is provided a method of transmitting data in a sensor network by a sender node having transmission data from among a plurality of nodes which perform a low power listening (LPL) operation in an asynchronous manner at predetermined time intervals. The method includes generating a second preamble comprising at least one first preamble and sequentially transmitting the second preamble and the transmission data, in which each of the at least one first preamble includes information regarding a destination address of the transmission data, a remainder of the second preamble at a time position of the first preamble, and a length of the transmission data.

According to another aspect of the present invention, there is provided a method of receiving data in a sensor network by a receiver node from among a plurality of nodes which perform a low power listening (LPL) operation in an asynchronous manner at predetermined time intervals. The method includes determining whether a valid signal is sensed during an active state in the LPL operation, receiving a first preamble transmitted from a sender node, which transmits the valid signal, from among the plurality of nodes, and determining a duration time of a deactivated state of the receiver node based on a destination address of data transmitted by the sender node, a remainder of a second preamble including the received first preamble at a time position of the received first preamble, and a length of the data from among information included in the received first preamble.

According to another aspect of the present invention, there is provided a method of transmitting/receiving data in a sensor network. The method includes sensor nodes's generating a second preamble comprising at least one first preamble for reducing overhearings of other nodes, where the sender node has transmission data and the sender node and the other nodes are from among a plurality of nodes which perform a low power listening (LPL) operation in an asynchronous manner at predetermined time intervals, the sender node's sequentially transmitting the second preamble and the transmission data, receiver node's determining whether a valid signal transmitted from the sender node is sensed during an active state in the LPL operation and receiving the first preamble transmitted from the sender node if it is determined that the valid signal is sensed, where the receiver node is from among the plurality of nodes, and the receiver node's determining a duration time of a deactivated state of the receiver node based on a destination address of the transmission data transmitted by the sender node, a remainder of the second preamble including the received first preamble at a time position of the received first preamble, and a length of the transmission data from among information included in the received first preamble.

According to another aspect of the present invention, there is provided an asynchronous sensor network comprising a plurality of nodes which perform a low power listening (LPL) operation in an asynchronous manner at predetermined time intervals. The asynchronous sensor network includes a sender node, which is from among the plurality of nodes, generating a second preamble comprising at least one first preamble for reducing overhearing of other nodes if the sender node has transmission data, and sequentially transmitting the second preamble and the transmission data, and a receiver node determining whether a valid signal transmitted from the sender node is sensed during an active state in the LPL operation, receiving the first preamble transmitted from the sender node if it is determined that the valid signal is sensed, and determining a duration time of a deactivated state of the receiver node based on a destination address of the transmission data transmitted by the sender node, a remainder of the second preamble at a time position of the received first preamble, and a length of the transmission data from among information included in the received first preamble.

In this way, it is possible to solve a problem that neighboring nodes of a sender node wake up for overhearing during data transmission of the sender node.

BRIEF DESCRIPTION OF THE DRAWINGS

The above and other features and advantages of the present invention will become more apparent by describing in detail an embodiment thereof with reference to the attached drawings in which:

FIG. 4C is a flowchart illustrating a receive-mode operation executed by a single sensor node in the method illustrated in FIG. 4A, according to an embodiment of the present invention;

DETAILED DESCRIPTION OF THE INVENTION

Figure 1:
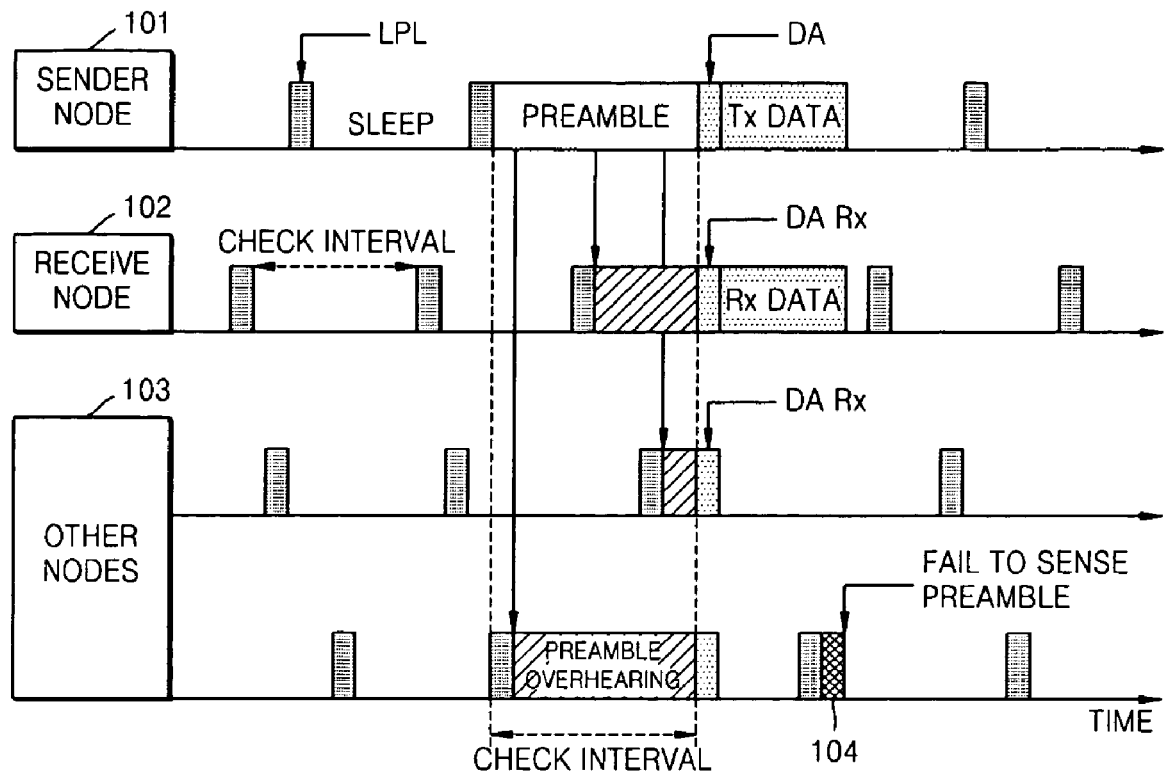
FIG. 1 is a diagram for explaining operations of sender node 101, receiver node 102, and other nodes 103, according to the Berkeley media access control (B-MAC)
Figure 2:
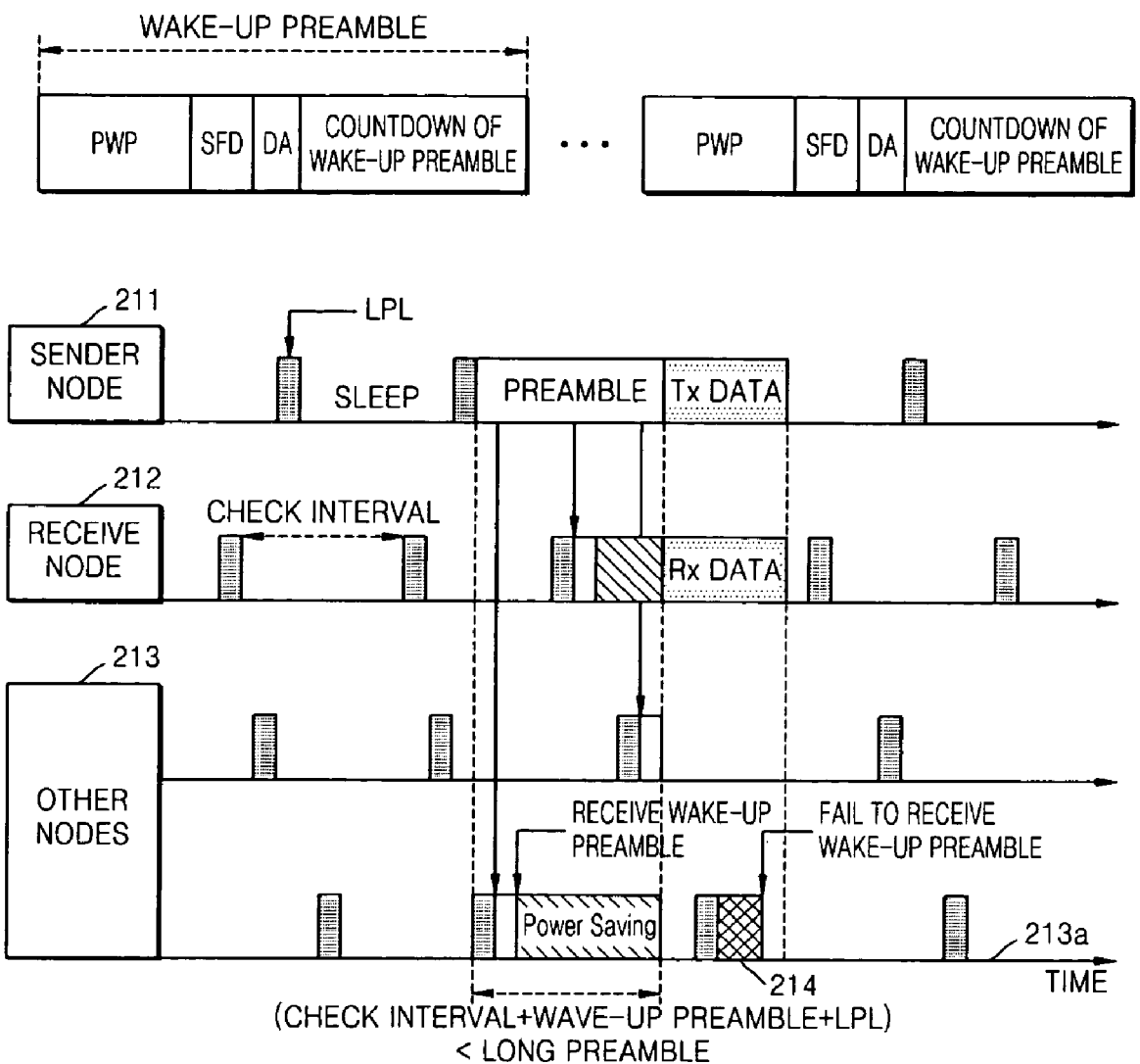
FIG. 2 is a diagram for explaining operations of sensor nodes, according to the B-MAC+.

Hereinafter, a method of transmitting data, a method of receiving data, and a method of transmitting/receiving data in a sensor network in order to reduce overhearing of sensor nodes, and a sensor network that implements the methods according to an embodiment of the present invention will be described in detail with reference to the accompanying drawings. It should be noted that like reference numerals refer to like elements illustrated in one or more of the drawings.

Figure 3:
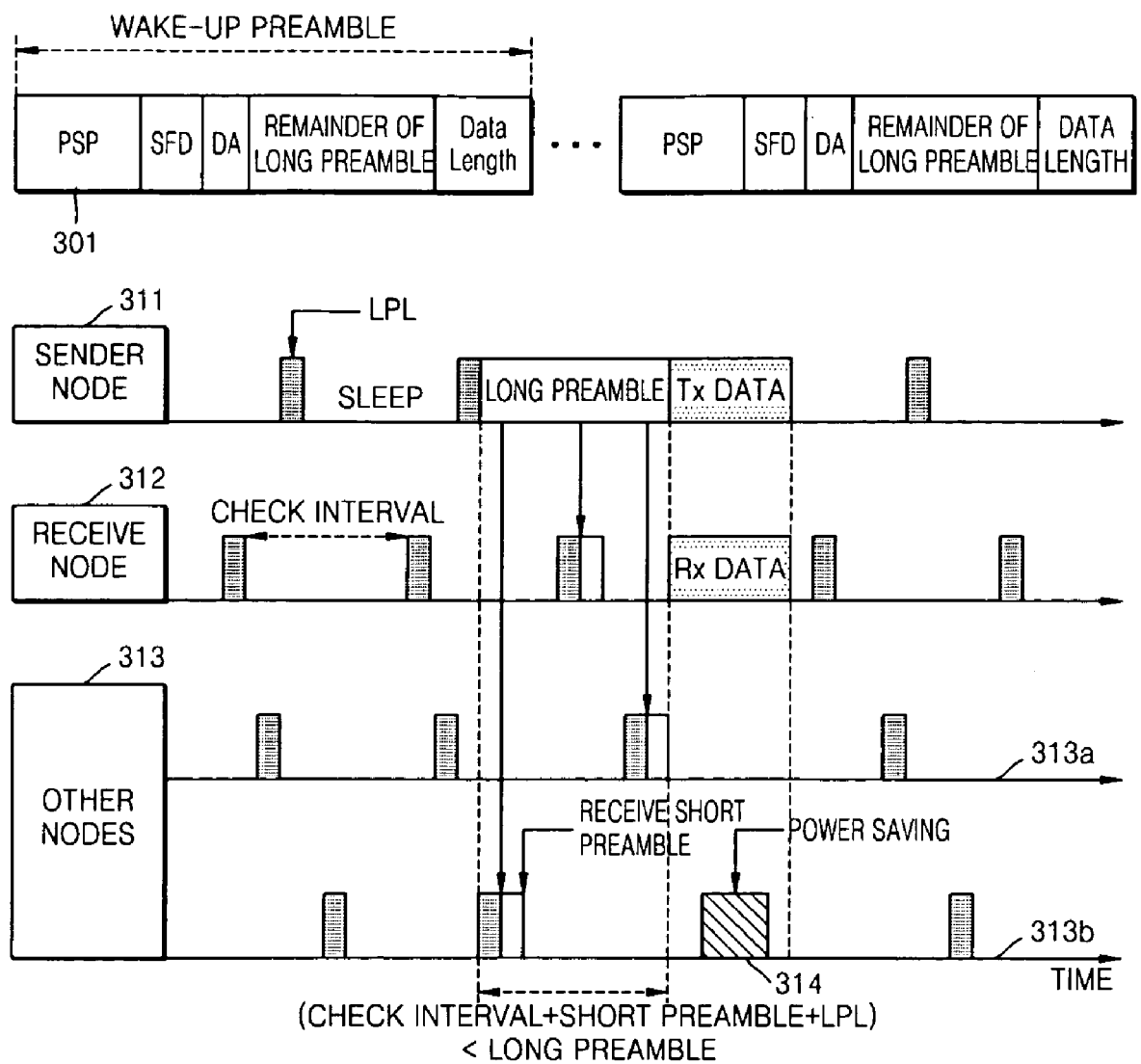
FIG. 3 is a diagram for explaining operations of sensor nodes in a sensor network for reducing overhearing of sensor nodes, according to an embodiment of the present invention.

FIG. 3 is a diagram for explaining operations of sender node 311, receiver node 312, and other nodes 313 in a sensor network for reducing overhearing of sensor nodes, according to an embodiment of the present invention.

Referring to FIG. 3, the sender node 311 transmits transmission data, the receiver node 312 for which the transmission data is destined receives the transmission data of the sender node 311, and two of the neighboring other nodes 313 for which the transmission data is not destined performs reception. The sender node 311, receiver node 312, and other nodes 313 may use a media access control (MAC) scheme.

The sender node 311, receiver node 312, and other nodes 313 perform a low power listening (LPL) operation at different points in time and have same intervals of a sleep state, i.e., the same check intervals. Here, the 'sleep state' of a sensor node means a state where the sensor node cannot receive a signal from other sensor nodes or check a channel, i.e., in a deactivated state.

Here, the LPL operation indicates an operation of periodically waking up for sampling a channel. By performing the LPL operation, a node checks whether the channel is clear, i.e., determines whether a valid signal for the channel is sensed.

If the sender node 311 contains transmission data and determines that the channel is clear, i.e., determines that a valid signal for the channel is not sensed after a second LPL operation, the sender node 311 sequentially transmits a long preamble, i.e., a second preamble including consecutive short preambles, i.e., first preambles 301 for a destination node, and the transmission data. At this time, the length of the long preamble needs to be longer than a sum of a check interval, the length of a single short preamble, and the length of time taken for a single LPL operation, so that both the receiver node 312 and other nodes 313 neighboring the sender node 311 can sense the long preamble and succeed to receive the single short preamble.

Here, the short preambles are continuously transmitted because the LPL operation senses only a signal valid for the channel within a very short period of time. If the short preambles are transmitted at intervals in order to reduce energy consumption caused by the transmission of the long preamble, an LPL operation interval needs to be long and thus the sender node 311, receiver node 312, and other nodes 313 perform the LPL operation during a long interval even if there are no data transmitting/receiving, increasing the overall energy consumption in the sensor network.

As illustrated in FIG. 3, each of the short preambles 301 comprises information such as a preamble-of-short-preamble (PSP), a start frame delimiter (SFD), a destination address (DA), a remainder-of-long-preamble, and a data length.

The PSP is required for bit synchronizations and the SFD indicates the start of valid information in byte units. The DA indicates a destination address to which the sender node 311 desires to transmit the transmission data. The remainder-of-long-preamble indicates a remainder of a long preamble at a time position of a short preamble including the remainder-of-long-preamble. The data length indicates the length of the transmission data.

The receiver node 312 repeats the LPL operation and a sleep operation, and determines that a signal valid for a channel is sensed during a third LPL operation and turns on a radio to receive a short preamble. The receiver node 312 checks the DA included in the received short preamble, determines whether the receiver node 312 itself is a destination for transmission data, and maintains the sleep state during a length, i.e., time, indicated in the remainder-of-long-preamble. After the lapse of the indicated time, the receiver node 312 wakes up in order to receive the transmission data transmitted by the sender node 301.

The other nodes 313 for which the transmission data is not destined for receive the short preamble, check the DA of the received short preamble, and recognize that they are not destinations of the transmission data, and maintain the sleep state during a sum of the length indicated in the remainder-of-long-preamble field and the length indicated in the data length field.

In the B-MAC+, since the wake-up preamble, which is a short preamble, does not include the data length field, some of the other nodes 313 wake up to perform the LPL operation during data transmission of the sender node 201 and consume energy to sense a valid signal for a channel and receive the short preamble. However, in the present invention, sensor nodes operating as illustrated on a time axis 313b of FIG. 3 maintain the sleep state as indicated by 314 during data transmission of the sender node 301, thereby preventing overhearing of the sensor nodes and thus saving energy accordingly.

Figure 4A:
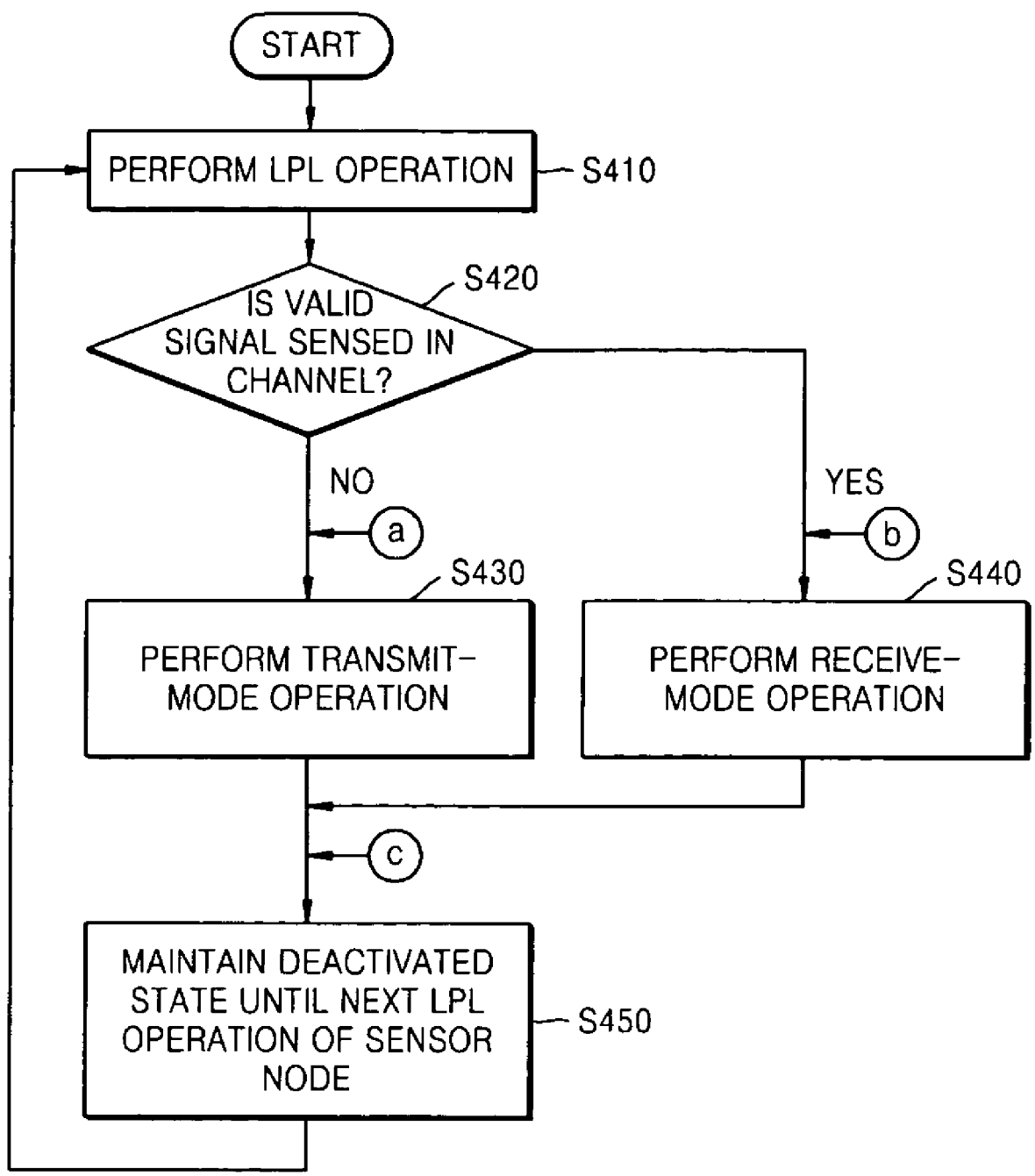
FIG. 4A is a flowchart illustrating a method of transmitting/receiving data, which is executed by a single sensor node in a sensor network, according to an embodiment of the present invention.

FIG. 4A is a flowchart illustrating a method of transmitting/receiving data, which is executed by a single sensor node in a sensor network, according to an embodiment of the present invention.

Referring to FIG. 4A, the single sensor node performs an LPL operation in operation S410. If the sensor node determines that a channel is clear, i.e., determines that a valid signal for the channel is not sensed in operation S420, the sensor node switches to a transmit mode and performs a corresponding transmit-mode operation in operation S430. If the sensor node determines that the valid signal is sensed in operation S420, the sensor node switches to a receive mode and performs a corresponding receive-mode operation in operation S440. Thereafter, the sensor node maintains a deactivated state until a point of time of its next LPL operation in operation S450 and then performs a next LPL operation.

Figure 4B:
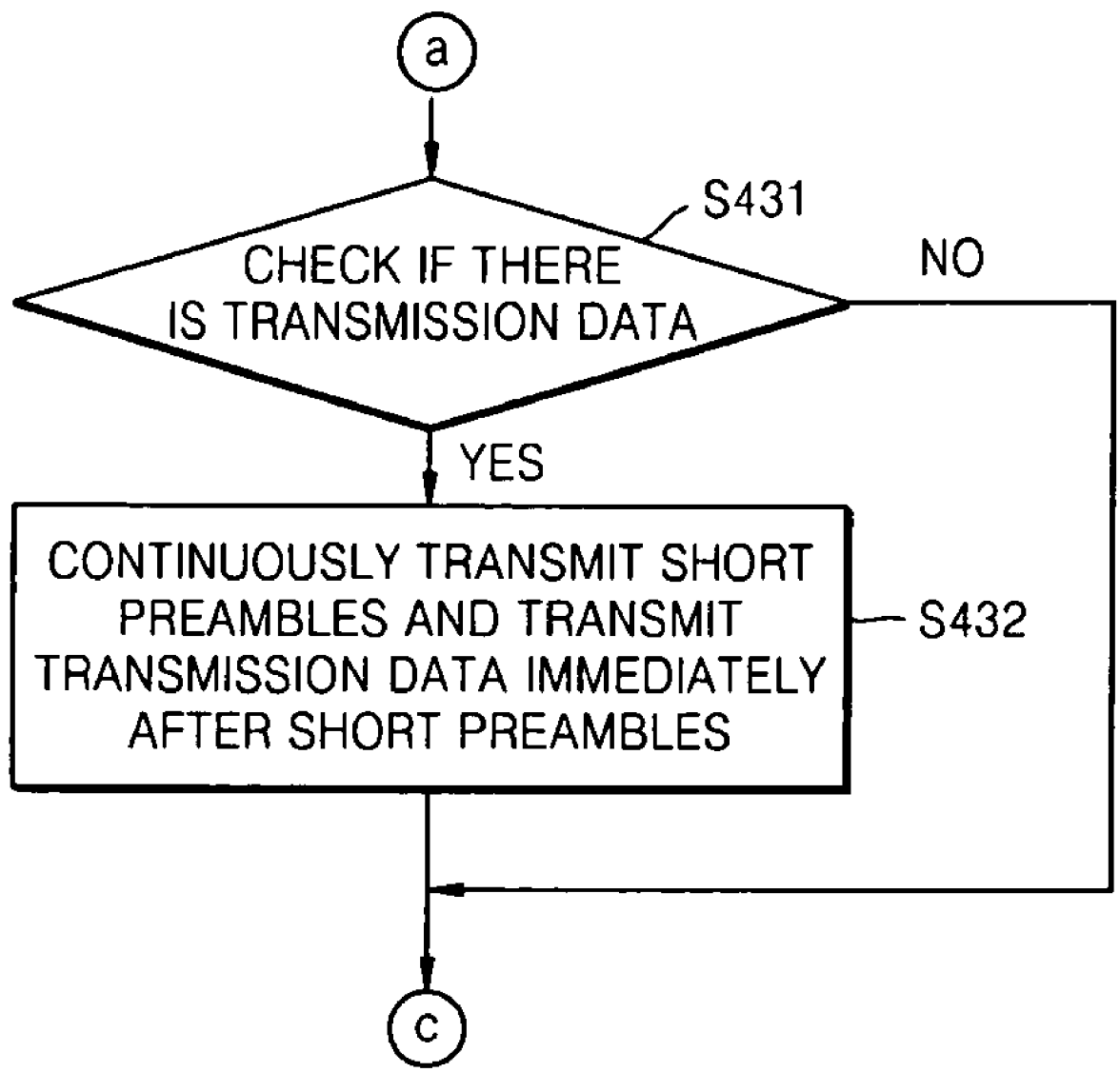
FIG. 4B is a flowchart illustrating a transmit-mode operation executed by a single sensor node in the method illustrated in FIG. 4A, according to an embodiment of the present invention.

FIG. 4B is a flowchart illustrating the transmit-mode operation of operation S430, which is executed by the single sensor node in the method illustrated in FIG. 4A, according to an embodiment of the present invention.

Referring to FIG. 4B, if the sensor node determines that the valid signal for the channel is not sensed in operation S420, it determines whether there is transmission data in operation S431. If there is transmission data, the sensor node continuously transmits short preambles for reducing overhearing and transmits the transmission data immediately after the short preambles in operation S432.

FIG. 4C is a flowchart illustrating the receive-mode operation of operation S440, which is executed by the single sensor node, in the method illustrated in FIG. 4A, according to an embodiment of the present invention.

Referring to FIG. 4C, upon sensing the valid signal for the channel in operation S420, the sensor node turns on a radio in order to receive the short preamble, and receives a radio signal. In this case, the sensor node receives the short preamble during a sufficient time for which the sensor node can succeed to receive the short preamble, i.e., during a predetermined valid time for reception of the short preamble in operation S441. The sensor node then determines whether the reception of the short preamble has been completed in operation S442. If not, the sensor node determines whether the predetermined valid time has expired in operation S443. If so, i.e., if the sensor node fails to receive the short preamble during the predetermined valid time, the sensor node regards the reception as reception of a dummy data and turns off the radio to maintain the deactivated state until a point of time of its next LPL operation in operation S450, and then performs the next LPL operation. If the predetermined valid time does not expire in operation S443, the sensor node repeats operation S441 to receive the short preamble during the predetermined valid time.

When it is determined that the reception of the short preamble has been completed in operation S442, the sensor node obtains information such as a DA, a remainder-of-long-preamble, and a data length through the short preamble. The sensor node having received the short preamble checks if the sensor node itself is a destination of the transmission data by using the DA, i.e., checks if the sensor node is included in the DA in operation S444.

If the sensor node confirms that it is the destination of the transmission data, it maintains the deactivated state during a time corresponding to a remainder of a long preamble at a time position of the received short preamble, i.e., during a time indicated in the remainder-of-long-preamble, in order to save energy in operation S445, and wakes up when a sender node transmits the transmission data in order to receive the transmission data in operation S446. At this time, the sensor node can recognize how many consecutive short preambles remain through the remainder-of-long-preamble.

If the sensor node confirms that it is not the destination of the transmission data, it maintains the deactivated state during a sum of the time indicated in the remainder-of-long-preamble and a time corresponding to the length indicated in the data length field in order to reduce energy consumption in operation S447.

Figure 5:
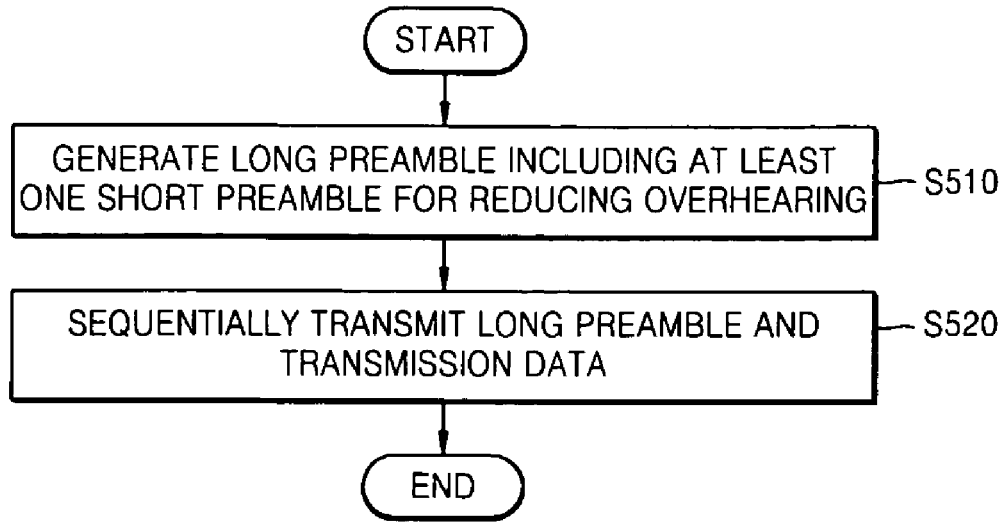
FIG. 5 is a flowchart illustrating a method of transmitting data in a sensor network for reducing overhearing of sensor nodes, according to an embodiment of the present invention.

FIG. 5 is a flowchart illustrating a method of transmitting data in a sensor network for reducing overhearing of sensor nodes, according to an embodiment of the present invention.

Operations of FIG. 5 may correspond to operation 432 of FIG. 4B. In other words, FIG. 5 shows a case where a sender node has already performed an LPL operation, determined that a signal valid for a channel is not sensed, and has transmission data.

Referring to FIG. 5, a sender node having transmission data from among a plurality of nodes performing an LPL operation in an asynchronous manner at predetermined time intervals generates a long preamble including at least one short preamble for reducing overhearing of the other nodes in operation S510. Here, the short preamble is composed of a DA indicating the DA of the transmission data, a remainder-of-long-preamble indicating the remainder of the long preamble at a time position of the short preamble, and a data length indicating the length of the transmission data as described above.

The sender node sequentially transmits the long preamble and the transmission data in operation S520.

Figure 6:
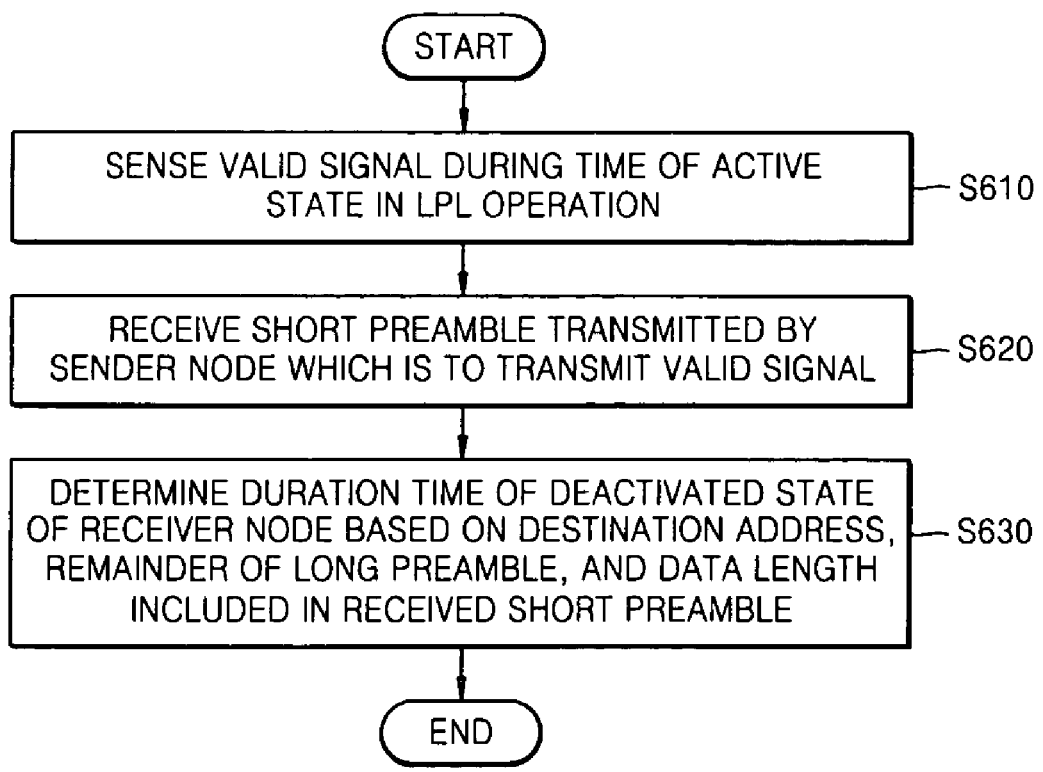
FIG. 6 is a flowchart illustrating a method of receiving data in a sensor network for reducing overhearing of sensor nodes, according to an embodiment of the present invention.

FIG. 6 is a flowchart illustrating a method of receiving data in a sensor network for reducing overhearing of sensor nodes, according to an embodiment of the present invention.

Operations of FIG. 6 may correspond to operation 420 of FIG. 4A and operations of FIG. 4C. In other words, FIG. 6 shows a case where a receiver node has already performed its LPL operation and determined that a valid signal for a channel is sensed.

Referring to FIG. 6, a receiver node from among a plurality of nodes performing an LPL operation in an asynchronous manner at predetermined time intervals determines whether a valid signal is sensed during an active state in the LPL operation in operation S610.

If the receiver node determines that the valid signal is sensed in operation S610, the receiver node receives a short preamble transmitted from a sender node which transmits the valid signal from among the plurality of nodes in operation S620.

If the receiver node succeeds in receiving the short preamble, the receiver node determines the duration time of a deactivated state of the receiver node based on a DA indicating the DA of transmission data to be transmitted by the sender node, a remainder-of-long-preamble indicating the remainder of a long preamble including the received short preamble at a time point of the received short preamble, and a data length indicating the length of the transmission data from among information included in the received short preamble in operation S630.

The method of transmitting data and the method of receiving data in the sensor network for reducing overhearing of sensor nodes according to an embodiment of the present invention have been described so far with reference to FIGS. 4A through 6. A method of transmitting/receiving data in a sensor network for reducing overhearing of sensor nodes can be implemented by a node, e.g., a sender node executing the method of transmitting data and another node, e.g., a receiver node executing the method of receiving data. Thus, the method of transmitting/receiving data will not be described in detail.

Similarly, it is obvious that the sensor network can be composed of sensor nodes implementing functions described with reference to FIGS. 4A through 6 and thus, the sensor network is not illustrated in detail in drawings.

As described above, according to the present invention, it is possible to solve a problem where neighbor nodes of a sender node wake up and overhear data during data transmission of the sender node. In other words, by minimizing overhearing of the sensor nodes in a sensor network environment, especially in a sensor network environment using media access control (MAC), power consumption, i.e., energy consumption, of the sensor nodes can be minimized.

Moreover, energy consumption of receiver nodes receiving a signal of a sender node in a sensor network can be reduced, thereby saving more energy in an environment having dense sensor nodes.

Furthermore, by removing overhearing during data reception, more energy can be saved as the length of data increases and the frequency of data generation increases.

In addition, the life span of a sensor node can be extended through energy consumption minimization and energy saving, thereby allowing a sensor network to operate properly for a longer period of time.

The present invention can be embodied as a computer-readable code on a computer-readable recording medium. The computer-readable recording medium is any data storage device that can store data which can thereafter be read by a computer system. Examples of computer-readable recording media include read-only memory (ROM), random-access memory (RAM), CD-ROMs, magnetic tapes, floppy disks, optical data storage devices, and carrier waves. The computer-readable recording medium can also be distributed over a network of coupled computer systems so that the computer-readable code is stored and executed in a decentralized fashion.

While the present invention has been particularly shown and described with reference to an embodiment thereof, it will be understood by those of ordinary skill in the art that various changes in form and detail may be made therein without departing from the spirit and scope of the present invention as defined by the following claims.

What is claimed is:

1. An asynchronous sensor network comprising a plurality of nodes which perform a low power listening (LPL) operation in an asynchronous manner at predetermined time intervals, the asynchronous sensor network comprising:

a sender node, which is from among the plurality of nodes, generating a second preamble comprising at least one first preamble for reducing overhearing of other nodes if the sender node has transmission data, and sequentially transmitting the second preamble and the transmission data; and a receiver node determining whether a valid signal transmitted from the sender node is sensed during an active state in the LPL operation, receiving the first preamble transmitted from the sender node if it is determined that the valid signal is sensed, and determining a duration time of a deactivated state of the receiver node based on a destination address of the transmission data transmitted by the sender node, a preamble remainder of the second preamble at a time position of the received first preamble, and a length of the transmission data from the plurality of nodes among information included in the received first preamble.

2. The asynchronous sensor network of claim 1, wherein the plurality of nodes use media access control (MAC).

3. A method of transmitting/receiving data in a sensor network, the method comprising:

sender node's generating a second preamble comprising at least one first preamble for reducing overhearings of other nodes, where the sender node has transmission data and the sender node and the other nodes are from among a plurality of nodes which perform a low power listening (LPL) operation in an asynchronous manner at predetermined time intervals;

the sender node's sequentially transmitting the second preamble and the transmission data;

receiver node's determining whether a valid signal transmitted from the sender node is sensed during an active state in the LPL operation and receiving the first preamble transmitted from the sender node if it is determined that the valid signal is sensed, where the receiver node is from among the plurality of nodes; and the receiver node's determining a duration time of a deactivated state of the receiver node based on a destination address of the transmission data transmitted by the sender node, a preamble remainder of the second preamble including the received first preamble at a time position of the received first preamble, and a length of the transmission data from the plurality of nodes among information included in the received first preamble.

4. The method of claim 3, further comprising, the sender node's maintaining a deactivated state until a point of time of a next LPL operation after the sequential transmission of the second preamble and the transmission data by the sender node.

5. The method of claim 3, further comprising:

receiver node's switching to the deactivated state based on the determined duration time of the deactivated state of the receiver node;

receiver node's receiving the transmission data transmitted by the sender node after the duration time of the deactivated state of the receiver node or performing a next LPL operation.

6. A method of receiving data in a sensor network by a receiver node from among a plurality of nodes which perform a low power listening (LPL) operation in an asynchronous manner at predetermined time intervals, the method comprising:

determining whether a valid signal is sensed during an active state in the LPL operation;

receiving a first preamble transmitted from a sender node, which transmits the valid signal, from among the plurality of nodes; and determining a duration time of a deactivated state of the receiver node based on a destination address of data transmitted by the sender node, a preamble remainder of a second preamble including the received first preamble at a time position of the received first preamble, and a length of the data from the plurality of nodes among information included in the received first preamble.

7. The method of claim 6, further comprising:

switching to the deactivated state based on the determined duration time of the deactivated state of the receiver node;

receiving the data transmitted by the sender node after the duration time of the deactivated state of the receiver node if the receiver node is included in the destination address of the data; and maintaining the deactivated state until a point of time of a next LPL operation.

8. The method of claim 6, wherein the reception of the first preamble comprises:

determining whether the reception of the first preamble is complete;

determining whether a predetermined valid time for the reception of the first preamble has expired if the reception of the first preamble is not complete;

repeating determining whether the reception of the first preamble is complete if the predetermined valid time has not expired.

9. The method of claim 6, wherein the determination of the duration time of the deactivated state of the receiver node comprises:

determining whether the receiver node is included in the destination address of the data;

determining the duration time of the deactivated state of the receiver node based on a time interval corresponding to the remainder of the second preamble at the time position of the received first preamble if it is determined that the receiver node is included in the destination address of the data; and determining the duration time of the deactivated state of the receiver node based on a sum of the time interval corresponding to the remainder of the second preamble at the time position of the received first preamble and a time interval corresponding to the length of the data if it is determined that the receiver node is not included in the destination address of the data.

10. The method of claim 6, wherein the first preamble further comprises a first preamble for bit synchronization and a start frame delimiter indicating a start of valid information in units of bytes.

11. The method of claim 6, wherein a length of the second preamble is longer than a sum of the predetermined time interval, a length of the received first preamble, and a length of a time interval during which the LPL operation is performed.

12. The method of claim 6, wherein the plurality of nodes perform the LPL operation at different points in time.

13. The method of claim 6, wherein the plurality of nodes use media access control (MAC).

14. A method of transmitting data in a sensor network by a sender node having transmission data from among a plurality of nodes which perform a low power listening (LPL) operation in an asynchronous manner at predetermined time intervals, the method comprising:

generating a second preamble comprising at least one first preamble; and sequentially transmitting the second preamble and the transmission data, wherein each of the at least one first preamble comprises information regarding a destination address of the transmission data, a preamble remainder of the second preamble at a time position of the first preamble, and a length of the transmission data from the plurality of nodes.

15. The method of claim 14, further comprising maintaining a deactivated state until a point of time of a next LPL operation after the sequential transmission of the second preamble and the transmission data.

16. The method of claim 14, wherein each of the at least one first preamble further comprises a preamble for bit synchronization and a start frame delimiter (SFD) indicating start of valid information in units of bytes.

17. The method of claim 14, wherein a length of the second preamble is longer than a sum of the predetermined time interval, a length of each of the at least one first preamble, and a length of a time interval during which the LPL operation is performed.

18. The method of claim 14, wherein the plurality of nodes perform the LPL operation at different points in time.

19. The method of claim 14, wherein the plurality of nodes use media access control (MAC).

* * * * *